United States Patent
Webber et al.

(10) Patent No.: US 6,671,690 B2
(45) Date of Patent: Dec. 30, 2003

(54) DELETIONS ON CIRCULAR SINGLY LINKED LISTS

(75) Inventors: Thomas Peter Webber, Petersham, MA (US); Hugh Kurth, Lexington, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 314 days.

(21) Appl. No.: 09/832,681

(22) Filed: Apr. 10, 2001

(65) Prior Publication Data

US 2002/0147700 A1 Oct. 10, 2002

(51) Int. Cl.[7] .............................................. G06F 17/30
(52) U.S. Cl. ....................................................... 707/100
(58) Field of Search ................................ 707/100, 101, 707/102

(56) References Cited

U.S. PATENT DOCUMENTS

| | | | | |
|---|---|---|---|---|
| 5,659,739 A | * | 8/1997 | Lubbers et al. ............. | 707/102 |
| 5,713,014 A | * | 1/1998 | Durflinger et al. ............. | 707/4 |
| 5,933,655 A | * | 8/1999 | Vrabec et al. ................ | 710/60 |
| 6,208,764 B1 | * | 3/2001 | Archer et al. ............... | 382/260 |
| 6,272,499 B1 | * | 8/2001 | Wooten ...................... | 707/102 |
| 6,445,680 B1 | * | 9/2002 | Moyal ........................ | 370/236 |

* cited by examiner

*Primary Examiner*—Safet Metjahic
*Assistant Examiner*—Haythim J. Alaubaidi
(74) *Attorney, Agent, or Firm*—Beyer Weaver & Thomas,

(57) ABSTRACT

Methods and apparatus for deleting a member in a circular singly linked list are described. Just prior to the current pointer register being updated, its contents are copied to the previous pointer register. When the consumer needs to delete a member from the list, the previous member location is known because it is saved in the previous pointer register. In this way, deletions done at the time of scanning involve only a single SRAM write access since the contents of the current pointer register is copied into the member referenced by the previous pointer register.

12 Claims, 6 Drawing Sheets

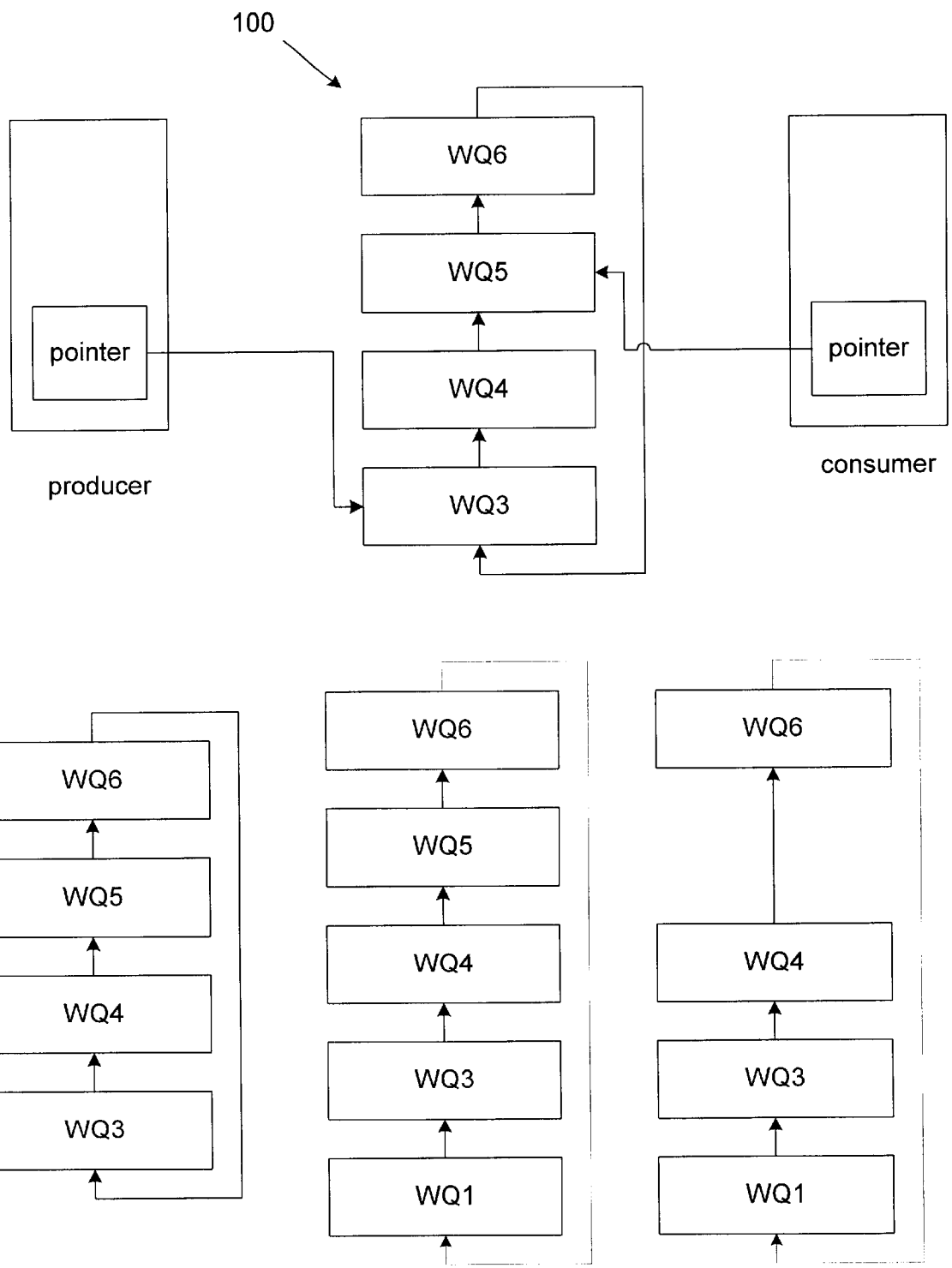
Fig. 1   PRODUCER INSERTS WQ1 ONTO LIST   CONSUMER DELETES WQ5 FROM LIST

DELETIONS ON CIRCULAR SINGLY LINKED LISTS

BACKGROUND OF THE INVENTION

1. Field of Invention

The present invention relates generally to methods, apparatus, and systems for manipulating data structures in a computing system. More particularly, the present invention relates to deleting data on a circular, singly linked list.

2. Description of the Related Art

Linked lists are well known in the art, and various methods have been employed to manipulate linked lists. Linked lists are one of the most common data structures employed for the manipulation of data. Linked lists are particularly important with an operating system. Operating systems control a variety of resources simultaneously. A linked list might be used, for example, to hold requests for each individual resource. Circular linked lists can also be used in a server-client environment where the server uses the circular linked list to record those clients that are waiting for service at a particular time. By using the circular linked list, a server can insure that its attention is evenly distributed amongst the waiting clients by visiting and servicing each waiting client as it circulates around the list. Using a consumer/producer model to visualize the linked list, the server can be considered the consumer and the clients each representing a producer as illustrated in FIG. 1 that shows a linked list 100 representing individual work queues (WQ). As shown in FIG. 1, a producer adds work queues with new work to the list 100 as a consumer continually scans the list, processing packets from each work queue in turn and deletes a work queue when it's packets are spent. Using this arrangement, the list 100 contains all work queues that are pending where they remain so long as they still have work (or packets to transmit) until it is ultimately deleted when the work (or packet) has been depleted.

Generally, linked lists can take two forms: (1) circular singly linked lists; or (2) circular doubly linked lists. With a singly linked list, each member contains a field pointing to the next member while doubly linked lists add a second pointer to each member that points to the previous member. Although doubly linked lists facilitate scanning in the reverse direction, they are more difficult to maintain since the additional pointers require additional write operations to static random access memory (SRAM), substantially increasing cycle time over singly linked lists.

Therefore, focusing on the singly linked lists such as that shown in FIG. 1, the producer uses a register referred to as a root pointer that points to a member in the list. The producer adds a new member into the list 100 by copying the contents of the root pointer into the new member and overwrites the root pointer with an index to the new member where members are typically stored in SRAM. Since accesses to the same SRAM can not generally be parallelized, it is important for performance reasons to keep the number of reads and writes to memory at a minimum. Although registers can be accessed in parallel but do not have the density of SRAM.

The consumer scans the list by following the next pointer that is embedded in each member. The next pointer points to the next member on the list. The consumer scans the list by copying the next pointer into a register called the current pointer. The current pointer register is used to read the next member. When the next member is read, its next pointer field is copied into the current pointer register. By repeating the process every member on a circular linked list can be scanned. A scan is done with a single read access to SRAM.

Unfortunately, the drawback with singly linked lists is deletions. When a consumer has to delete a member, the consumer must overwrite the member preceding the one to be deleted. Since next pointers only point forward, locating the preceding member is difficult and time consuming without backward pointers.

Therefore what is desired is an efficient method, apparatus, and system for deleting a member in a circular singly linked list.

SUMMARY OF THE INVENTION

Methods and apparatus for augmenting a scan operation of a circular singly linked list by providing a method, apparatus, and system for deleting a member of a circular singly linked list using a single SRAM write access is described. During a scan operation of a list member having a next pointer field, the contents of the next pointer field are saved in the current pointer register. As the current pointer register is updated, the current register content is copied to a previous pointer register. In order to delete the list member during the scan, the content of the current pointer register is copied to the next pointer field of the list member referenced by the previous pointer register. The current member is deleted and the next pointer field of the previous member references the next member of the linked list. In this way, deletions done at the time of scanning involve only a single SRAM write access.

In another embodiment, an apparatus for deleting a current member of a circular, singly linked list is described requiring only a single memory write operation.

In yet another embodiment, a computer program product for deleting a current member of a circular, singly linked list is described.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings.

FIG. 1 is a diagrammatic representation of a conventional circular singly linked list.

DETAILED DESCRIPTION OF THE EMBODIMENTS

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment.

To the contrary, it is intended to cover alternatives, modifications, and equivalents as may be included within the spirit and scope of the invention as defined by the appended claims.

Often a consumer of a circular singly linked list will continually scan the list reading each member in its list order. During a scan operation of a list member having a next pointer field, the contents of the next pointer field are saved in the current pointer register. As the current pointer register is updated, the current register content is copied to a previous pointer register. In order to delete the list member during the scan, the content of the current pointer register is copied to the next pointer field of the list member referenced by the previous pointer register. The current member is deleted and the next pointer field of the previous member references the next member of the linked list. In this way, deletions done at the time of scanning involve only a single SRAM write access.

This approach differs from doubly linked lists in that it does not link the entire list since it only links the previous member. Fortunately, that is all that is needed for the deletion operation if the deletion operation is performed by the consumer at the time the consumer scans the member. When the consumer needs to delete a member from the list, the previous member location is known because it is saved in the previous pointer register. In this way, deletions done at the time of scanning involve only a single SRAM write access since the contents of the current pointer register is only copied into the member referenced by the previous pointer register.

The invention will now be described in terms of a circular, singly linked list where each member of the list includes both a content field for storing data as well as a next pointer field. It should be noted, however, that the invention is equally well suited for applications where some, if not all of the members of the circular, singly linked circular list include only a next pointer field.

Figure 2A:
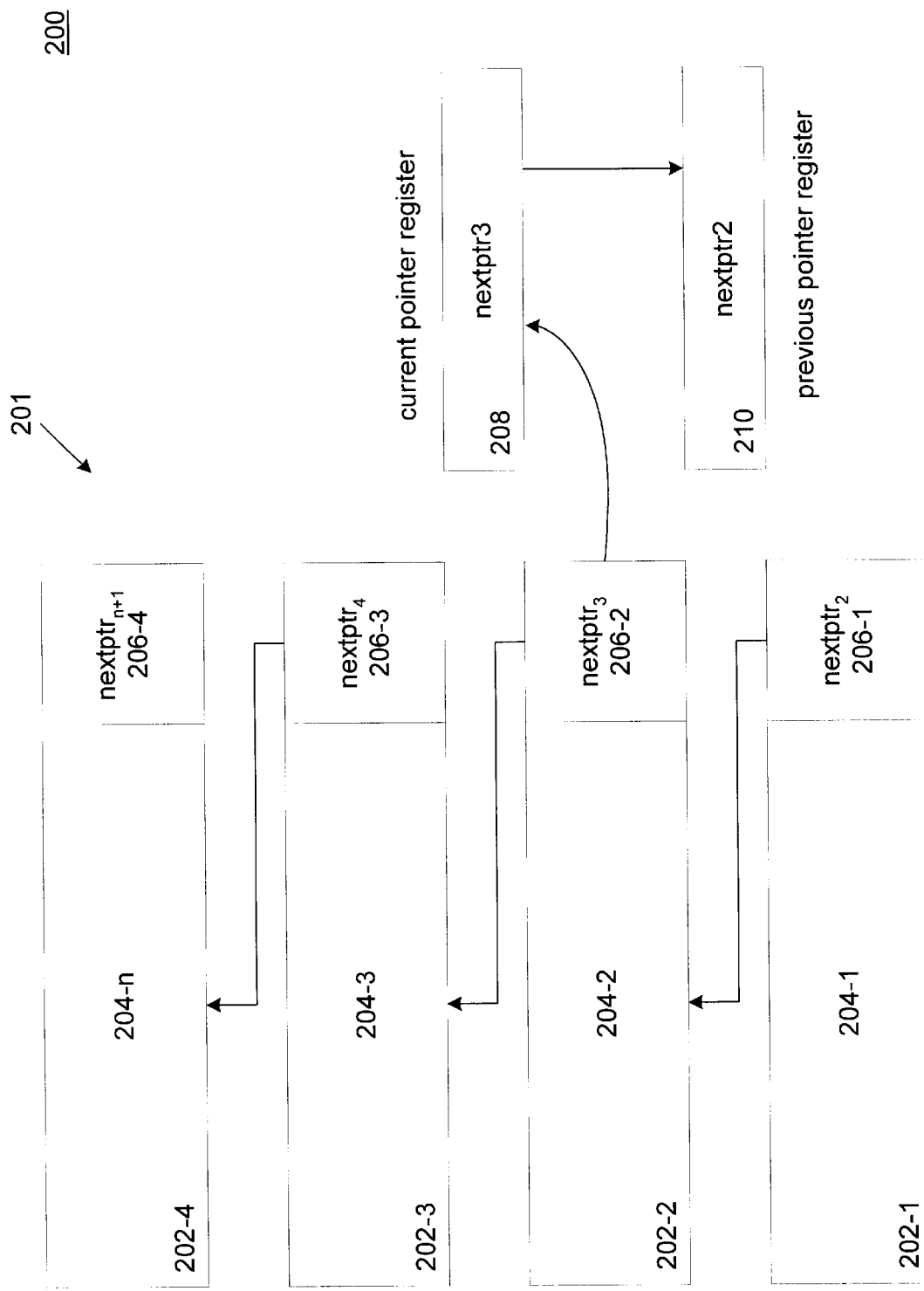
FIGS. 2A–2C illustrate an exemplary deletion operation in a circular singly linked list in accordance with an embodiment of the invention.
Figure 2B:
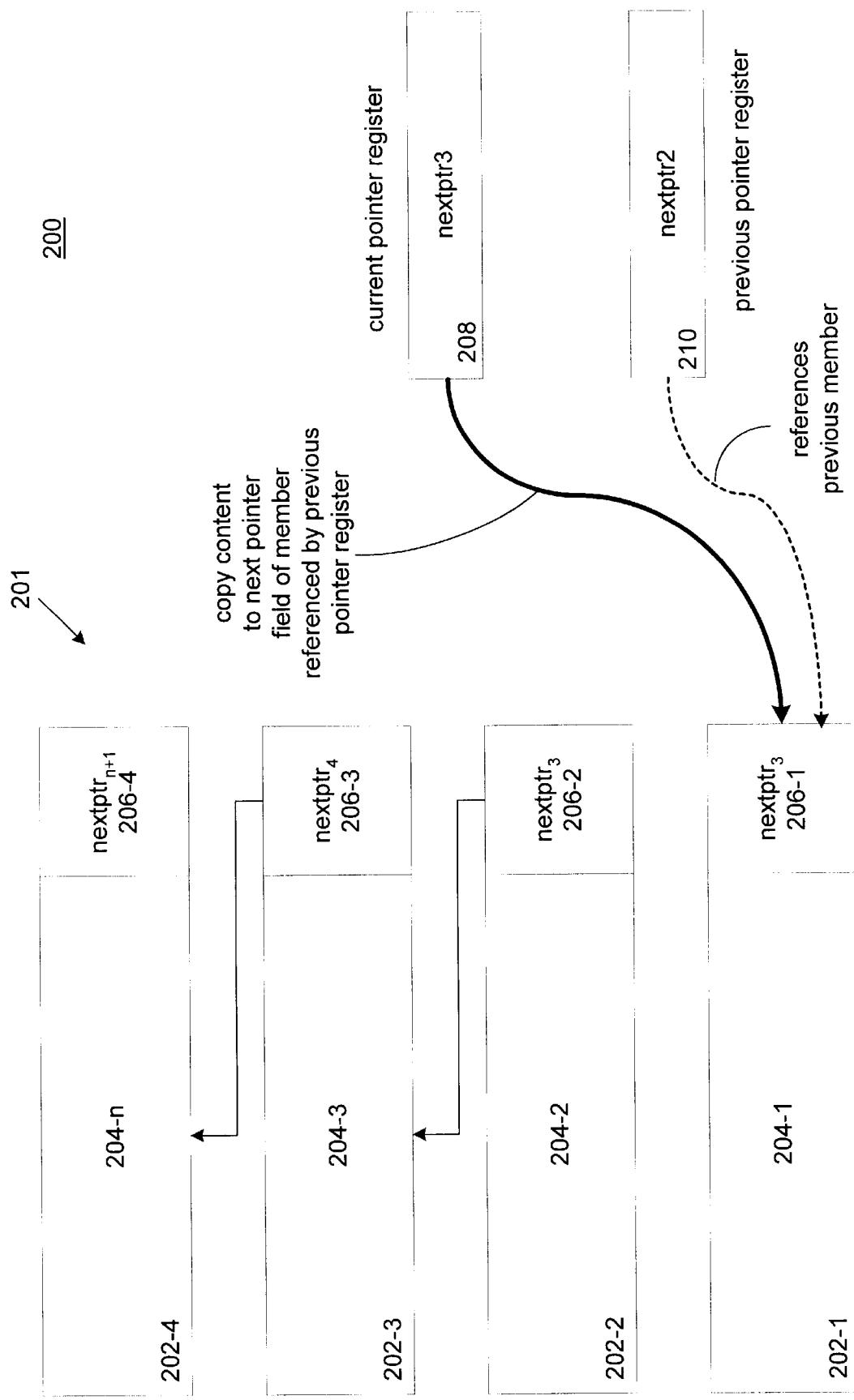
Figure 2C:
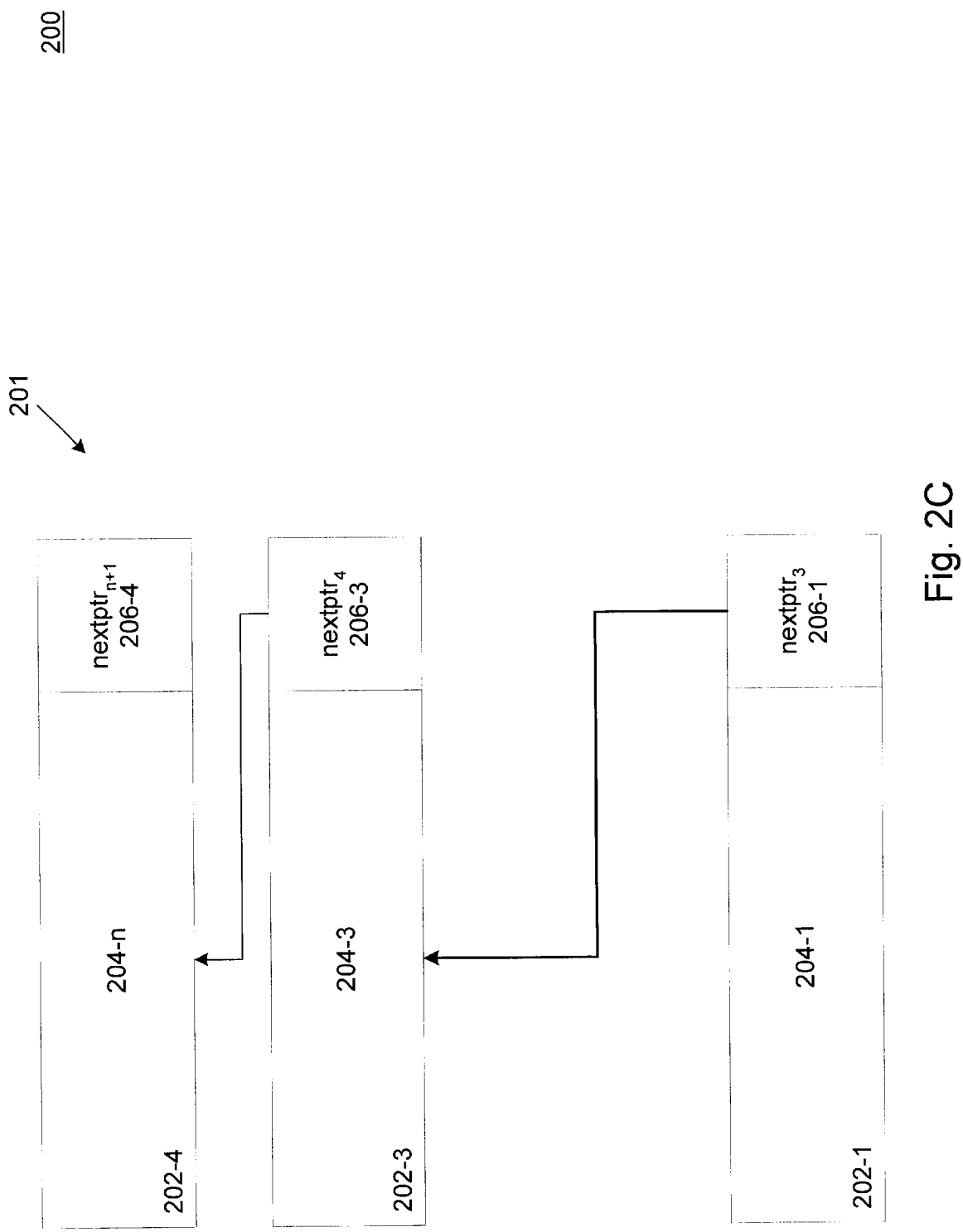

FIGS. 2A–2C illustrates a system 200 for performing an exemplary deletion operation in a circular singly linked list 201 in accordance with an embodiment of the invention. As shown in FIG. 2A, the circular singly linked list 201 is formed of a number of work queues (WQ) 202, also referred to as members, each of which is formed of a content (or data) field 204 and a next pointer field 206. For example, the member 202-1 includes a content field 204-1 and an associated next pointer field 206-1 that points to, or otherwise, references the next member of list 200, which in this case is the member 202-2. Similarly, the member 202-2 includes a content field 204-2 and an associated next pointer field 206-2 that points to, or otherwise, references the next member of list 200, which in this case is the member 202-3, and so on. It is important to note that as mentioned above, with the singly linked list, each next pointer only points to, or otherwise references, the next member of the linked list. The system 200 also includes a current pointer register 208 into which is stored a next pointer associated with a current member of the list 201.

Using the consumer/producer paradigm as described above, each time the consumer scans a current member on the list, the consumer copies the contents of the scanned member's next pointer field into the current pointer register and locates the next member of the list to be scanned using the content of current pointer register. Using the list 201 as an example, when the consumer scans the member 202-1, the consumer copies the contents of the next pointer field 206-1 (i.e., "nextptr$_2$") to the current pointer register 208 that is used, in turn, to locate the next member in the linked list 201 to be scanned, namely member 202-2. In the described embodiment, when the member 202-2 is scanned, as the current pointer register 208 is updated with "nextptr$_3$", the current register content (i.e., "nextptr$_2$") is copied to a previous pointer register 210.

In order to delete the current member 202-2, for example, during the scan, the content of the current pointer register 208 is copied to the next pointer field 206-1 of the list member 202-1 referenced by the previous pointer register 210. In this way, when the current member 202-2 is deleted, the next pointer field 206-1 of the previous member 202-1 references the next member 202-3 of the linked list 201. In so doing, the consumer can delete the member 202-2 without having to search the entire linked list 201 for the previous member 202-1 since the appropriate pointer (i.e., next ptr$_3$) is now stored in the next pointer field 206-1 of the member 202-1 which is now pointing directly to the member 202-3 as shown in FIG. 2C. In this way, only a single write operation to SRAM occurs when the contents of the current pointer register is copied to the next pointer field thereby improving performance over what would otherwise be required in a conventional deletion operation in a circular singly linked list system.

Figure 3:
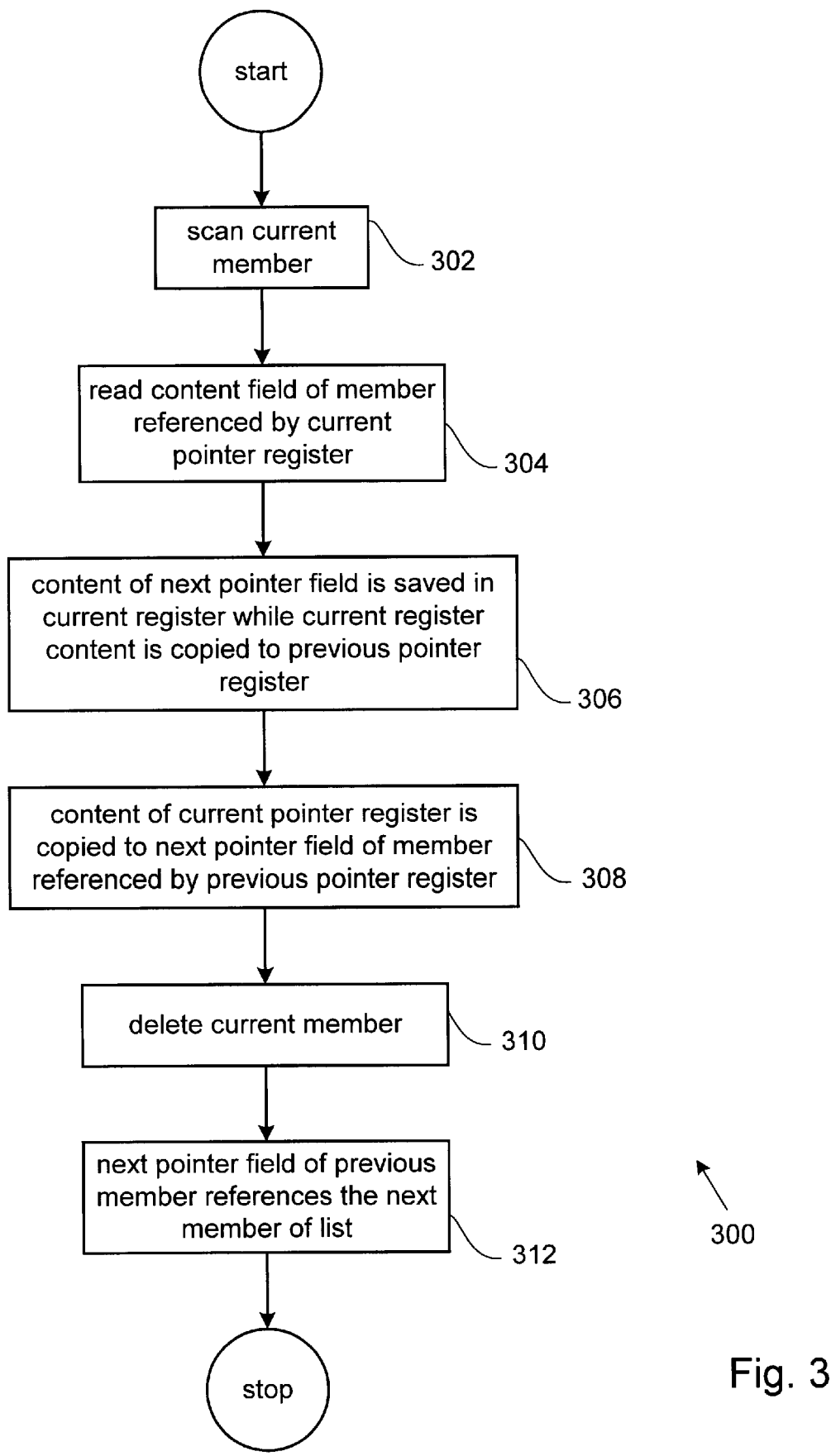
FIG. 3 shows a flowchart detailing a process for deleting a member in a circular singly linked list in accordance with an embodiment of the invention.

FIG. 3 shows a flowchart detailing a process 300 for deleting a member in a circular singly linked list in accordance with an embodiment of the invention. During a scan operation of a list member having a content field and a next pointer field 302, a consumer reads the content field of the list member pointed to by a current pointer register at 304. At 306, the content of the next pointer field is saved in the current register as the current register content is copied to a previous pointer register. The content of the current pointer register is copied at 308 to the next pointer field of the list member referenced by the previous pointer register. The current member is deleted at 310 and the next pointer field of the previous member references the next member of the linked list at 312.

Figure 4:
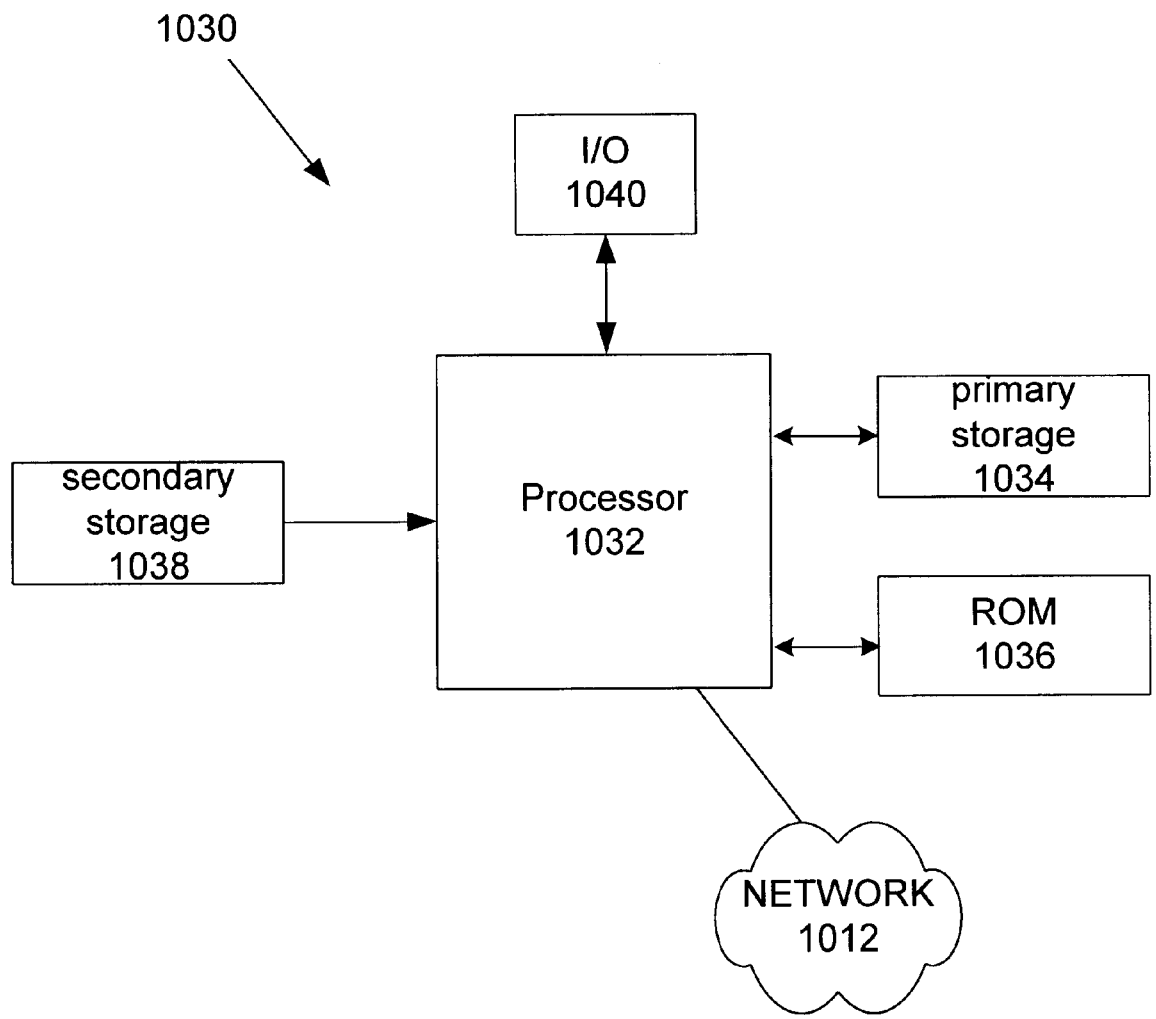
FIG. 4 is a diagrammatic representation of a general-purpose computer system suitable for implementing the present invention.

FIG. 4 illustrates a typical, general-purpose computer system suitable for implementing the present invention. The computer system 1030 includes at least one processor 1032 (also referred to as a central processing unit, or CPU) that is coupled to memory devices including primary storage devices 1036 (typically a read only memory, or ROM) and primary storage devices 1034 (typically a random access memory, or RAM).

Computer system 1030 or, more specifically, CPUs 1032, may be arranged to support a virtual machine, as will be appreciated by those skilled in the art. One example of a virtual machine that may be supported on computer system 1030 will be described below with reference to FIG. 7. As is well known in the art, ROM acts to transfer data and instructions uni-directionally to the CPUs 1032, while RAM is used typically to transfer data and instructions in a bi-directional manner. CPUs 1032 may generally include any number of processors. Both primary storage devices 1034, 1036 may include any suitable computer-readable media. A secondary storage medium 1038, which is typically a mass memory device, is also coupled bi-directionally to CPUs 1032 and provides additional data storage capacity. The mass memory device 1038 is a computer-readable medium that may be used to store programs including computer code, data, and the like. Typically, mass memory device 1038 is a storage medium such as a hard disk or a tape which generally slower than primary storage devices 1034, 1036. Mass memory storage device 1038 may take the form of a magnetic or paper tape reader or some other well-known device. It will be appreciated that the information retained within the mass memory device 1038, may, in appropriate cases, be incorporated in standard fashion as part of RAM 1036 as virtual memory. A specific primary storage device 1034 such as a CD-ROM may also pass data unidirectionally to the CPUs 1032.

CPUs 1032 are also coupled to one or more input/output devices 1040 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPUs 1032 optionally may be coupled to a computer or telecommunications network, e.g., an internet network or an intranet network, using a network connection as shown generally at 1012. With such a network connection, it is contemplated that the CPUs 1032 might receive information from the network, or might output information to the network in the course of performing the above-described method steps. Such information, which is often represented as a sequence of instructions to be executed using CPUs 1032, may be received from and outputted to the network, for example, in the form of a computer data signal embodied in a carrier wave. The above-described devices and materials will be familiar to those of skill in the computer hardware and software arts.

It should be noted that the present examples are to be considered as illustrative and not restrictive, and the invention is not to be limited to the details given herein, but may be modified within the scope of the appended claims.

What is claimed is:

1. In a circular, singly linked list having a current member, a previous member, a next member, a current pointer register and a previous pointer register, a method for deleting the current member of the list having a current next pointer field that includes a current next pointer that references the next member of the list, comprising:

during a list scan operation, copying a content of the current pointer register that includes a previous next pointer associated with the previous member of the list to the previous pointer register;

saving the current next pointer in the current pointer register;

copying the content of the current pointer register to a previous next pointer field of a previous list member that is referenced by the previous pointer register;

deleting the current member; and referencing the next member of the list by the previous next pointer field.

2. A method as recited in claim 1, wherein the current member includes a current content field suitable for storing a data field.

3. A method as recited in claim 2, wherein the data field stored in the current content field is read by a consumer during the list scan operation.

4. A method as recited in claim 1, wherein the deletion requires only a single memory write operation.

5. In a circular, singly linked list having a current member, a previous member, a next member, a current pointer register and a previous pointer register, an apparatus for deleting the current member of the list having a current next pointer field that includes a current next pointer that references the next member of the list, comprising:

a means for copying a content of the current pointer register that includes a previous next pointer associated with the previous member of the list to the previous pointer register;

a means for saving the current next pointer in the current pointer register;

a means for copying the content of the current pointer register to a previous next pointer field of a previous list member that is referenced by the previous pointer register;

a means for deleting the current member; and a means for referencing the next member of the list by the previous next pointer field.

6. An apparatus as recited in claim 5, wherein the current member includes a current content field suitable for storing a data field.

7. An apparatus as recited in claim 6, wherein the data field stored in the current content field is read by a consumer during the list scan operation.

8. An apparatus as recited in claim 5, wherein the deletion requires only a single memory write operation.

9. In a circular, singly linked list having a current member, a previous member, a next member, a current pointer register and a previous pointer register, computer program product for deleting the current member of the list having a current next pointer field that includes a current next pointer that references the next member of the list, comprising:

computer code for copying a content of the current pointer register that includes a previous next pointer associated with the previous member of the list to the previous pointer register;

computer code for saving the current next pointer in the current pointer register;

computer code for copying the content of the current pointer register to a previous next pointer field of a previous list member that is referenced by the previous pointer register;

computer code for deleting the current member;

computer code for referencing the next member of the list by the previous next pointer field; and a computer-readable medium that stores the computer codes.

10. A method as recited in claim 9, wherein the current member includes a current content field suitable for storing a data field.

11. A method as recited in claim 10, wherein the data field stored in the current content field is read by a consumer during the list scan operation.

12. A method as recited in claim 9, wherein the deletion requires only a single memory write operation.

* * * * *